Nov. 21, 1944.     A. LANDAU     2,363,275
UTILITY HOOK
Filed April 23, 1943
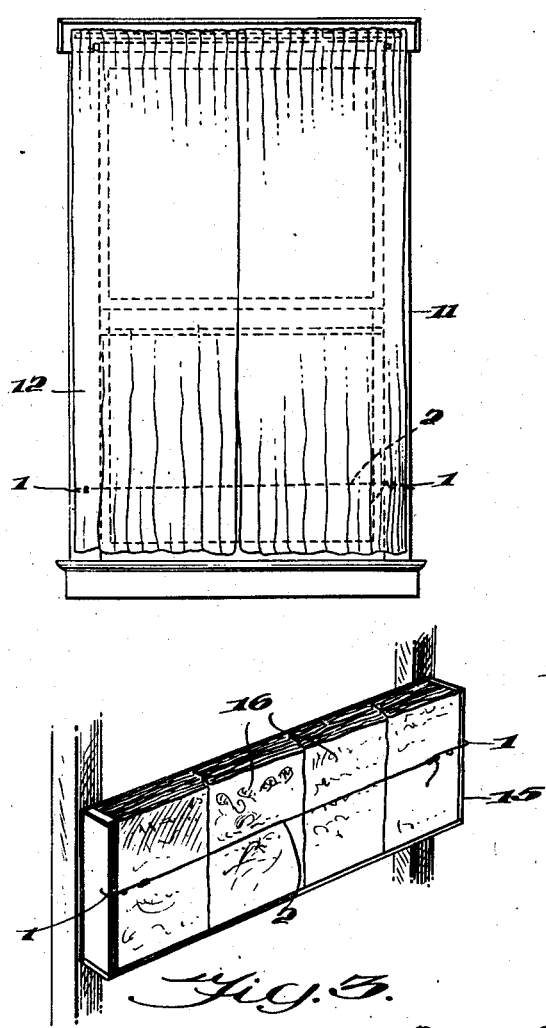
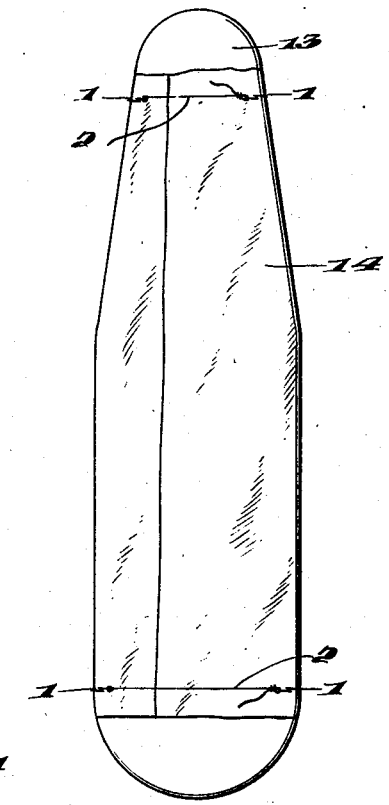
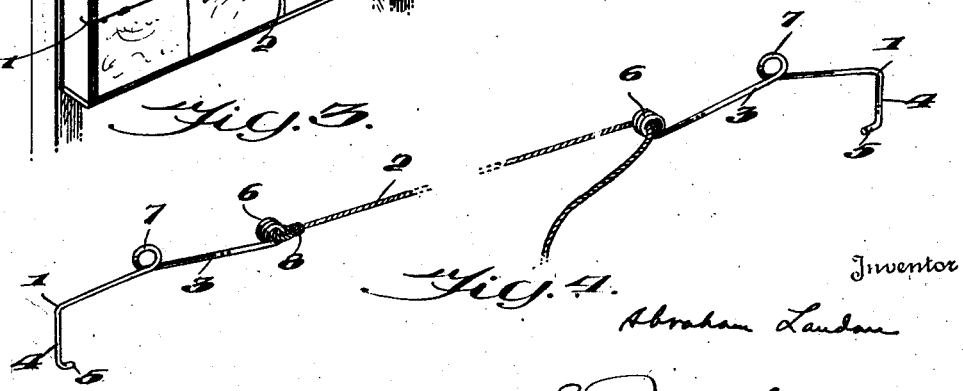
Inventor
Abraham Landau
By J. Preston Swecker
his Attorney Patented Nov. 21, 1944

2,363,275

UNITED STATES PATENT OFFICE 2,363,275

UTILITY HOOK

Abraham Landau, Washington, D. C.

Application April 23, 1943, Serial No. 484,258

2 Claims. (Cl. 24—73)

This invention relates to an improvement in utility hooks of the character used for holding in place covering material, curtains or other articles, over windows, boards, supports and the like.

Such holders as have been provided heretofore for this purpose, have been expensive to manufacture, or so complex of structure as to be difficult to use or result in an unsightly appearance, causing marring of the surfaces, and difficult of application and removal.

The object of this invention is to provide a very simple and effective holder, which may be manufactured at little cost for sale at a low price, and which will be effective in use to hold coverings and other articles in place securely, and which may be readily applied and removed when desired.

This is accomplished by the provision of a pair of hooks adapted to be connected together by a tape or other flexible member which may be secured to the hooks and which jointly will secure the supported articles in place, holding these effectively. Provision is made for the application of resilient holding pressure as a result of the construction of the hooks, and these may be applied to different types of articles and to articles of different sizes, due to the universal character of the hook construction, making it readily adaptable for a wide variety of uses.

A preferred embodiment of the invention is shown in the accompanying drawing, in which:

Fig. 1 is a side elevation of a window, showing the invention applied thereto;

Fig. 2 is a bottom plan view of an ironing board having the invention applied thereto;

Fig. 3 is a perspective view of a book rack utilizing this invention; and

Fig. 4 is a detached perspective view of the hooks and tape.

The embodiment of the invention illustrated in Fig. 4, utilizes a pair of hook devices designated generally by the numeral 1 and connected together by a tape or cord 2.

Each of the hook devices is preferably formed of wire or other suitable material having substantial rigidity. The device is formed of an elongated shank 3 with a laterally turned hook 4 on one end thereof, which hook includes an inturned prong 5, thus forming a substantially L-shaped structure, constituting the hook and the shank thereof. The opposite free end of the shank is formed with an eyelet 6, preferably formed by several turns of the wire to facilitate the attachment and tying of the tape 2, as hereinafter described. Intermediate the length of the shank 3 is a single loop formed in the wire shown at 7, to provide a spring coil therein, so as to impart the desired resiliency to the shank of the hook.

A pair of hooks is used jointly to form a holder substantially as shown in Fig. 4, with the hooks 4 turned toward each other to embrace the object to which the holder is applied. The tape or cord 2 should be secured in a loop knot shown at 8, to one of the eyelets 6, and run loosely through the other eyelet 6. Then by drawing inward on the cord 2, pulling the hooks toward each other, these hooks may be secured tightly to the object to which they are applied, and then the free end of the cord tied securely to the eyelet of the second-mentioned hook, preventing lateral spreading of the hooks and holding them securely in place.

Fig. 1 shows an application of this holder to a window, in which the pair of hooks embrace the window-frame, designated 11, on opposite outer sides thereof, while the tape 2 extends between the hooks beneath the window curtain 12. Then when the window is raised, the tape prevents the curtain from blowing out through the open window, either free in the air or against the screen, and from being soiled, injured, or worn as a result thereof.

Fig. 2 shows another application of the holder to an ironing board 13, having the cover 14 thereof secured in place by two of the holders. After folding the cover about the ironing board, the hooks 1 should be applied thereover, and the tape 2 may then be drawn up and tied as described, thus securing the cover in place until removal is desired.

Still another application is shown in Fig. 3, in which an open book rack is shown generally at 15 containing a series of books or magazines 16 which are retained in place by a holder. The hooks 1 engage over opposite ends of the book rack and are drawn together thereon by the tape 2 which is then tied in place, as described.

To remove the holder in any such application, it is merely necessary to release the hooks either one or both of them, and they will slip off of their supported positions. The coiled springs 7 impart sufficient resiliency to the hooks to cause them to hug securely the opposed portions of the frame, board or the like on which the holder is applied, and yet allowing the hooks to give sufficiently for ready release to disengage the prongs 5 therefrom.

I claim:

1. A fastener of the character described comprising an elongated shank having a coil intermediate the ends thereof and offset from the length of the shank, one end portion of the shank extending outwardly from the coil and downwardly in the opposite direction from the coil and turned back upon itself forming a hook portion having a prong on the free end thereof, the other end portion of said shank extending in the opposite direction from said first-mentioned end portion and terminating in an eyelet.

2. A fastener of the character described comprising an elongated shank formed of wire and having an integral coil formed in one piece with the shank and wholly offset at one side of the shank intermediate the ends thereof, one end portion of the shank extending outwardly from the coil and downwardly substantially at right angles thereto in the opposite direction from the coil and turned back upon itself substantially at right angles to said down-turned portion forming a prong on the free end thereof, the other end portion of said shank extending in the opposite direction from the first-mentioned end portion and terminating in an eyelet.

ABRAHAM LANDAU.